(12) United States Patent
Schmidt (10) Patent No.: US 11,563,222 B1
(45) Date of Patent: Jan. 24, 2023

(54) SYSTEMS AND METHODS FOR PASSIVELY CONTROLLING PRESSURE WITHIN A CRYOGENIC STORAGE TANK

(71) Applicant: Ball Aerospace & Technologies Corp., Boulder, CO (US)

(72) Inventor: Jeffrey A. Schmidt, Longmont, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 1706 days.

(21) Appl. No.: 15/443,668

(22) Filed: Feb. 27, 2017

Related U.S. Application Data (60) Provisional application No. 62/299,895, filed on Feb. 25, 2016.

(51) Int. Cl.
| | |
|---|---|
| *H01M 8/04* | (2016.01) |
| *B63G 8/00* | (2006.01) |
| *H01M 8/04082* | (2016.01) |
| *H01M 8/04089* | (2016.01) |
| *H01M 8/0438* | (2016.01) |
| *H01M 8/04537* | (2016.01) |
| *H01M 8/04746* | (2016.01) |

(52) U.S. Cl.
CPC ........ *H01M 8/04208* (2013.01); *B63G 8/001* (2013.01); *H01M 8/0438* (2013.01); *H01M 8/04104* (2013.01); *H01M 8/04589* (2013.01); *H01M 8/04746* (2013.01); *B63G 2008/002* (2013.01); *F17C 2221/011* (2013.01); *F17C 2221/012* (2013.01); *F17C 2250/0626* (2013.01); *F17C 2250/0689* (2013.01); *F17C 2270/0581* (2013.01); *H01M 2250/20* (2013.01)

(58) Field of Classification Search
CPC ......... H01M 8/04208; H01M 8/04104; H01M 8/0438; H01M 8/04589; H01M 8/04746; B63G 8/001
See application file for complete search history.

(56) References Cited

U.S. PATENT DOCUMENTS

| | | | |
|---|---|---|---|
| 7,434,407 B2 | 10/2008 | Haberbusch | |
| 2006/0006108 A1* | 1/2006 | Arias | ................ H01M 8/04753 210/232 |

(Continued)

*Primary Examiner* — Ula C Ruddock
*Assistant Examiner* — Frank A Chernow
(74) *Attorney, Agent, or Firm* — Sheridan Ross P.C.

(57) ABSTRACT

An all mechanically controlled, non-venting pressure control system for liquid hydrogen and liquid oxygen cryogenic tanks that requires no electrical control while managing disparate, non-stoichiometric reactant boil-off rates is provided. The pressure control system allows for the passive and repeatable stoichiometric consumption of hydrogen and oxygen boil-off from cryogenic tanks to form liquid water, while preventing the liquid hydrogen and liquid oxygen cryogenic tanks from overpressurizing and venting to the external environment. More particularly, in response to an overpressure condition in a first reactant reservoir, a back-pressure regulator is opened, providing the overpressure first reactant to a fuel cell or other consumer, and providing a pilot signal to open a supply line from a second reactant reservoir to the consumer. Whether the second reactant is supplied from the second reactant reservoir as gas or a liquid is determined based on the pressure within the second reactant reservoir.

23 Claims, 5 Drawing Sheets

(56) References Cited

U.S. PATENT DOCUMENTS

2006/0230679 A1* 10/2006 Matos Da Silva ....... F17C 9/02
 48/174
2016/0049672 A1* 2/2016 Tomita .............. H01M 8/04373
 429/446

* cited by examiner

SYSTEMS AND METHODS FOR PASSIVELY CONTROLLING PRESSURE WITHIN A CRYOGENIC STORAGE TANK

CROSS-REFERENCE TO RELATED APPLICATIONS

This application claims the benefit of U.S. Provisional Patent Application Ser. No. 62/299,895, filed Feb. 25, 2016, the entire disclosure of which is hereby incorporated herein by reference.

FIELD

Systems and methods for the passive, non-electrically controlled pressure management of cryogenic liquid hydrogen and liquid oxygen storage systems without relying on the venting of either gas to the environment through a pressure relief valve or device are provided.

BACKGROUND

When provided as gaseous reactants to a fuel cell for the generation of electrical power, cryogenic liquid hydrogen and liquid oxygen provide substantially higher energy density storage than primary and secondary batteries for the same volume. This power and energy storage approach has direct advantages and utility when used in an air independent environment, such as for power generation in unmanned underwater vehicles (UUV). However, liquid cryogenic reactants (liquid hydrogen (LH2) and liquid oxygen (LO2)) stored in passive thermally managed reservoirs or dewar tanks will continually develop pressure unless the boil-off ullage gasses are removed from the tank.

Pressure management in a cryogenic liquid hydrogen or liquid oxygen dewar is routinely accomplished by venting of the ullage gasses to the environment through a pressure relief mechanism or consuming them with an energy conversion device such as a fuel cell to generate electrical power and water. This venting or out flow reduces or maintains the pressure in the dewar by removing the ullage gasses and hence the excess thermal energy in the tank. However, it may be impractical or impossible to vent excess gasses to the environment. For example, UUVs are planned to operate at ocean depths greater than 1000-ft, where external pressures on the UUV will exceed 450-psia. Under such conditions, traditional lightweight cryogenic liquid hydrogen and oxygen dewar storage tanks are unable to vent overboard. Without the ability to vent through a passive pressure relief valve, pressure management of the dewars must be performed by the energy conversion device (e.g., fuel cell) and its associated electronic control system by consuming the boil-off to reduce any potential overpressure. In the event the fuel cell's electronic control system fails or becomes unreliable, the cryogenic storage tanks will overpressure and ultimately burst, resulting in the loss of the UUV.

More particularly, when passive relief pressure venting to the environment is not possible, a reactant consumer (say fuel cell) must, at a minimum, consume enough reactants (generate enough power) to match or exceed the nominal boil-off flow rate of the cryogens stored in the dewars in order to control the dewars internal pressures. Specifically, fuel cells consume hydrogen and oxygen in a balanced stoichiometric ratio of 2 molecules hydrogen to 1 molecule oxygen to form 2 molecules water (H2O). Because the dewar boil-off flow rates of either liquid hydrogen or liquid oxygen may not be exactly matched to this stoichiometric ratio, the fuel cell electronic control system must actively select between ullage gas feed and/or cryogenic liquid feed of reactants from either dewar to meet the required pressure-controlled flow rate at stoichiometric ratios. This can be accomplished using electronically controlled valves downstream of cryogenic liquid-to-gas and/or gas-to-gas heat exchangers that are opened and closed by the electronic fuel cell controller as a function of dewar tank pressure and system power demand. For instance, if the pressure as measured by an electronic pressure transducer in one tank (say hydrogen) is too high or above a preset upper threshold, then the (hydrogen) ullage valve is electronically opened and that reactant, post heat exchanger, is fed to the fuel cell anode to be consumed. This gaseous outflow results in a drop in pressure in the ullage of the tank. Concomitantly if the pressure in the other tank (say oxygen) is too low to meet the flow rate of the other reactant (say hydrogen), then a liquid feed valve for the other cryogenic reactant (say oxygen) is electronically opened and flashed to gas by a cryogenic liquid-to-gas heat exchanger. This scheme provides an ample flow rate of the other reactant (say oxygen) to the fuel cell cathode even when its ullage pressure and nominal boil-off rate is initially insufficient to meet the stoichiometric demand of the other reactant (say hydrogen) at the fuel cell. During liquid cryogen feed from either reactant dewar, the ullage pressure will naturally rise at a rate dictated by the thermal heat leak into the dewar. Once its ullage pressure has exceeded a preset threshold, the gas ullage feed valve will be opened to the fuel cell and the liquid feed valve closed. This electronically controlled alternating cryogenic gas/liquid feed scheme is sufficient to meet even the most dynamic power demand profiles.

The flow rate of reactants consumed stoichiometrically at the fuel cell is directly proportional to the electrical current and hence power being demanded from the fuel cell. In typical UUV operation, the fuel cell will load-follow the electrical power demand of the UUV system. Since these power demands are routinely greater than the highest boil-off rate of either reactant, dewar pressures will never rise above safe limits and in normal operation of the UUV and dewar tank pressure will be controlled. Note also that the aforementioned flow control scheme of alternating between gas and liquid feed as a function of dewar tank pressures to meet the fuel cells power demand is a superior flow control scheme over alternate techniques, such as the direct electrical heating of either tank to control pressure. In the latter case, cartridge heaters immersed in the liquid cryogen of each tank would be turned on and off to maintain the ullage pressure of the reactants above a minimum threshold to meet power demand. This electrical heating approach wastes the fuel cell system's energy resources and can potentially suffer from dangerous over pressurization due to the time lag response of the cryogen/ullage to heating when attempting to meet unpredictable power demands placed on the fuel cell by the UUV. If in either flow-control case, however, the fuel cell control system fails, is damaged, becomes unreliable or experiences a loss of a pressure transducer or electronically controlled valve, then cryogenic dewar pressures can exceed their design limits and fail, resulting in loss of the UUV. Accordingly, it would be desirable to provide passive, entirely mechanical systems and methods for ameliorating overpressure conditions in storage reservoirs.

SUMMARY

Embodiments of the present disclosure are directed to solving these and other problems and disadvantages of the prior art. More particularly, a pressure control system as disclosed herein can be used to control pressures within reservoirs containing reactants that are consumed in a chemical reaction. In accordance with at least some embodiments of the present disclosure, the pressure control system includes a fuel cell or other consumer that is separate from or different than a fuel cell or other consumer to which the reactants are supplied during normal operations.

In accordance with further embodiments of the present disclosure, the pressure control system operates in response to an overpressure condition within at least one of the reservoirs. In particular, the pressure control system draws the reactant contained within the at least one reservoir as a gas. The reactant contained within the other reservoir is withdrawn from that other reservoir as a gas, if the pressure within that other reservoir is greater than a minimum reference value. If the pressure within the other reservoir is less than the minimum reference value, the reactant is withdrawn from that other reservoir as a liquid. The withdrawn reactants are provided to the consumer, where they are combined. Where the consumer is a fuel cell, electrical energy generated by the combination can be dissipated as heat in a shunt resistor, and the water produced by the reaction can be placed in a storage reservoir. Accordingly, embodiments of the present disclosure can reduce pressures within storage reservoirs, without requiring venting of the over pressurized gas to the external environment. Moreover, embodiments of the disclosed pressure control system operates independently from the system, such as a fuel cell power system, that normally consumes the stored reactants. Furthermore, embodiments of the pressure control system disclosed herein are compatible with traditional pressure control or pressure relief systems.

In accordance with embodiments of the present disclosure, non-electronically controlled and activated pressure switches and valves are utilized to perform cryogenic reactant pressure management of both liquid hydrogen and liquid oxygen dewars, without the venting of either gas to the environment. This is a completely mechanical way of feeding gas from an overpressure tank or tanks and feeding liquid from the tank that is not over pressured to match the flow from the other tank to a reactant consumer, such as a load shunted fuel cell or a catalytic combustor, that produces only water as a byproduct. Accordingly, embodiments of the present disclosure allow dewar pressures to be managed during the fueling, launch, operation and recovery of an unmanned underwater vehicle (UUV) or other vehicle or installation utilizing these cryogenic reactants, without relying on or having knowledge of the integrity of electronic fuel cell controller or its electronic controlled balance of plant components.

DETAILED DESCRIPTION

Figure 1:
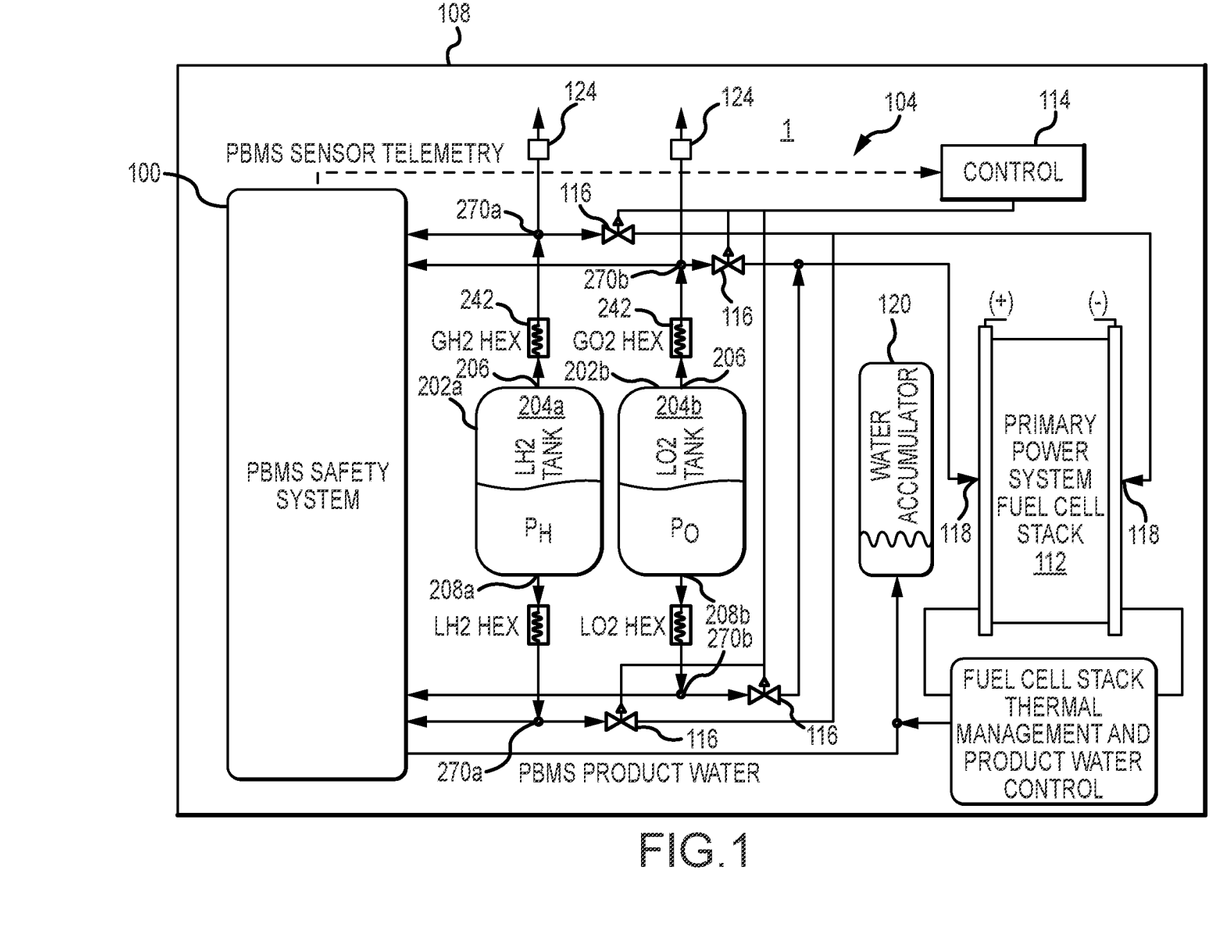
FIG. 1 depicts a pressure control system and an associated fuel cell power system in accordance with embodiments of the present disclosure.

FIG. 1 depicts a system 1 that includes a passive boil-off management system fhb S) or pressure control system 100 in accordance with embodiments of the present disclosure, and an associated fuel cell power system 104, installed within a vehicle or facility 108. In this example, the pressure control system 100 and the fuel cell power system 104 are installed within a vehicle 108 comprising an unmanned underwater vehicle (UUV). However, as can be appreciated by one of skill in the art after consideration of the present disclosure, a fuel cell power system 104 and a pressure control system 100 as disclosed herein can be employed in connection with any vehicle or facility 108 in which management of reactant pressures, without requiring venting to an outside atmosphere, is desired.

In general, the pressure control system 100 and the fuel cell power system 104 are connected in parallel to a number of cryogenic storage tanks or reservoirs 202. For example, the system 1 can include a first reservoir 202a containing a first reactant 204a (e.g., liquid hydrogen (LH2)), and a second reservoir 202b containing a second reactant 204b (e.g., liquid oxygen (LO2)). Each of the storage reservoirs 202 includes a first outlet 206. In general, reactants 204 are withdrawn from the storage reservoirs 202 through the respective first outlets 206 as gases. Downstream of the first outlets 206, boilers or heat exchangers 242 can be provided, for example to increase the temperature of the reactants 204 prior to delivering the reactants to other components of the fuel cell power system 104 or the pressure control system 100. Each storage reservoir 202 can also include a second outlet 208 to allow a reactant 204 to be removed from the reservoir 202 as a liquid.

The fuel cell power system 104 also includes a fuel cell stack or fuel cell 112. As an example but without limitation, the fuel cell 112 may comprise a proton exchange membrane (PEM) fuel cell. In general, the fuel cell 112 provides electrical power that can be used for the operation of the vehicle or facility 108. For instance, when the fuel cell power system 104 is associated with a UUV, power produced by the fuel cell 112 can be provided to on board communication, control, and propulsion systems. In normal operation, a controller 114 operates supply valves 116 to provide the reactants 204 to the inputs 118 of the fuel cell stack 112 in proportion to the power demands of the systems, devices or other consumers. Water produced by the combination of the reactants 204 within the fuel cell 112 can be collected in a water accumulator or reservoir 120. During normal operation, the electrical demands of the various consumers will require the consumption of a sufficient amount of the reactants 204 to match or exceed the nominal boil-off flow rate of the cryogenic reactants 204 in the storage reservoirs 202, in order to maintain pressures within the storage reservoirs 202 within design limits.

When the pressure within one or both of the storage reservoirs 202 exceeds a preset upper threshold, for example as measured by an electronic pressure transducer, the electronic fuel cell controller 114 can electronically operate the supply valves 116 in order to supply reactants to the fuel cell 112, thereby reducing pressure in the storage reservoirs 202. In the event of the failure of the fuel cell controller 114, one or both of the electronically operated valves 116, or failure of some other component of the fuel cell power system 104, the pressure within one or both of the storage reservoirs 202 can be reduced through operation of the pressure control system 100 disclosed herein. In addition, the pressure control system 100 can be provided in combination with conventional pressure relief valves and/or burst disks 124.

Figure 2A:
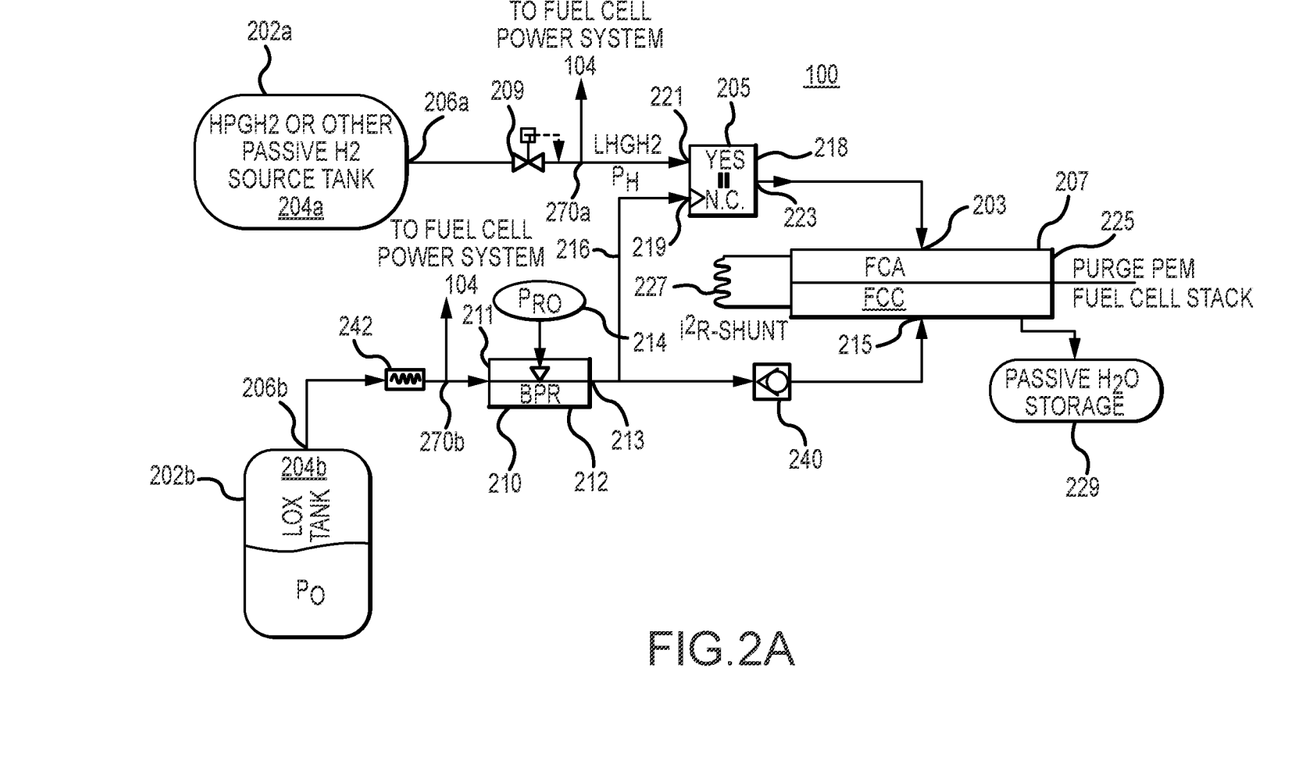
FIG. 2A depicts a pressure control system in accordance with embodiments of the present disclosure.

FIG. 2A depicts components of a pressure control system 100 in accordance with at least some embodiments of the present disclosure. The pressure control system 100 includes a first reservoir 202a containing a first reactant 204a, and a second reservoir 202b containing a second reactant 204b. In this exemplary embodiment, a pressure within the second reservoir 202b is monitored and controlled by the pressure control system 100. The first 202a and second 202b reservoirs can be connected to a primary consumer, such as but not limited to a primary fuel cell stack 112 of the fuel cell power system 104 via a Y or branch connection 270a/270b (see FIG. 1). The fuel cell stack 112 can be used for various purposes, such as providing electrical power to an associated vehicle or system.

The first 202a and second 202b reservoirs each include a first outlet 206. The first outlets 206 generally connect the reservoirs 202 to a consumer 207, such as a fuel cell stack or a catalytic combustor that is provided as part of the pressure control system 100. More particularly, the first outlet 206a of the first reservoir 202a may be placed in communication with a first inlet 203 of the consumer 207 by a supply switch 205. A pressure regulator 209 may be provided between the outlet 206a of the first reservoir 202a and an inlet 221 of the supply switch 205. The first outlet 206b of the second reservoir 202b is in communication with a pressure monitoring switch 210. The pressure monitoring switch 210 may comprise a back pressure regulator 212 that is operable to open when pressure within the second reservoir 202b exceeds a relief pressure of the back pressure regulator 212. When the back pressure regulator (BPR) 212 is open, reactant 204b is supplied from the second reservoir 202b to a second inlet 215 of the consumer 207. The relief pressure of the back pressure regulator 212 can be set by a pressure cell reference 214. As can be appreciated by one of skill in the art after consideration of the present disclosure, the pressure cell reference 214 can be in the form of a closed cylinder containing a gas at the desired reference pressure. In accordance with at least some embodiments, a heat exchanger 242 can be placed between the first outlet 206b of the second reservoir 202b and an inlet 211 to the back pressure regulator 212, to raise the temperature of the reactant 204b before it is passed to the back pressure regulator 212. The outlet 213 of the back pressure regulator 212 can be connected to a second inlet 215 of the consumer 207 via a check valve 240.

In accordance with embodiments of the present disclosure, the supply switch 205 may comprise a pressure activated relay 218. The pressure activated relay 218 can include a control input 219 that is in communication with the outlet 213 of the back pressure regulator 212. When the back pressure regulator 212 is open, an overpressure pilot signal 216 is applied to the control input 219 of the pressure activated relay 218. The pressure activated relay 218 is configured such that a communication pathway between the inlet 221 and the outlet 223 of the pressure activated relay 218 is normally closed. When an overpressure pilot signal 216 is present at the control input 219, the pressure activated relay 218 opens, placing the first reservoir 204a in communication with the first inlet 203 of the consumer 207.

Therefore, when an overpressure condition is detected within the second reservoir 202b, the first reactant 204a is supplied to the first inlet 203 of the consumer 207, and the second reactant 204b is supplied to the second inlet 215 of the consumer 207. In accordance with at least some embodiments of the present disclosure, the first reactant 204a can be in the form of a first one of oxygen and hydrogen, the second reactant 204b may be a second one of oxygen and hydrogen, and the consumer 207 may be a purge proton exchange membrane (PEM) fuel cell stack 225. Electrical power resulting from the reaction of the hydrogen and oxygen within the fuel cell 225 can be dissipated in a resistive load circuit 227. Water resulting from the reaction can be stored in a storage reservoir 229. In accordance with embodiments of the present disclosure, the consumer 207 is provided in addition to the fuel cell 112 of the fuel cell power system 104. Morevoer, the resistive load circuit 227 may be the only circuit that is supplied with electric power by the consumer 207. The reservoir 229 may be in addition to the water accumulator 120.

In at least some embodiments, a passive boil-off management system (PBMS) or passive boil-off pressure control system 100 configured as shown in FIG. 2A is used for High Pressure Gas H2 (HPGH2) as the first reactant 204a and liquid oxygen (LOX) as the second reactant 204b, and can have the following attributes:

1) The PBMS 100 is designed to be all mechanically passive, repeatable, non-venting and requires no electrical control while managing reactant boil-off;

2) The fuel cell 225 stoichiometrically consumes overpressure $H_2$ and/or $O_2$ producing $H_2O$, enthalpic and I2R-Heat. It will tolerate a pressure delta across the PEM membrane equal to or greater than $P_R$, 3) The fuel cell 225 is sized to be a multi-kilowatt stack thereby allowing it to process very high flow rates of reactants;

4) The process is only active when the LOX cryogenic reactant 204b storage tank 202b pressures exceeds its relief setting—$P_{RO}$;

5) When tank 202b pressure exceeds its relief pressure ($P_R$) then a back pressure regulator (BPR) 212 opens and charges the cathode of the fuel cell 225 with $O_2$;

6) A non-venting pneumatic logic element is utilized to allow GH2 from the passive H2 source tank 202a to be made available to the fuel cell 225 anode;

7) This is accomplished with a non-passing pressure activated relay ($PAR_{NP}$) 218 and triggered by the $P_{RO}$ pilot signal 216 from the overpressured LOX tank 202b;

8) Once the $PAR_{NP}$ 218 is opened, H2 is made available to the purge fuel cell 225 anode and reactants begin to be safely consumed to make $H_2O$, thereby reducing the pressure of the overpressured LOX tank 202b;

9) In operation, when guarding a locked-up LOX tank 202b, the overpressurized LOX tank 202b pressure will modulate around the hysteresis band of the relieving BPR 212.

This plumbing approach works equally well for a $LH_2$ tank and a passive gaseous oxygen source except that the anode and cathode feeds to the PEMFC are swapped.

Figure 2B:
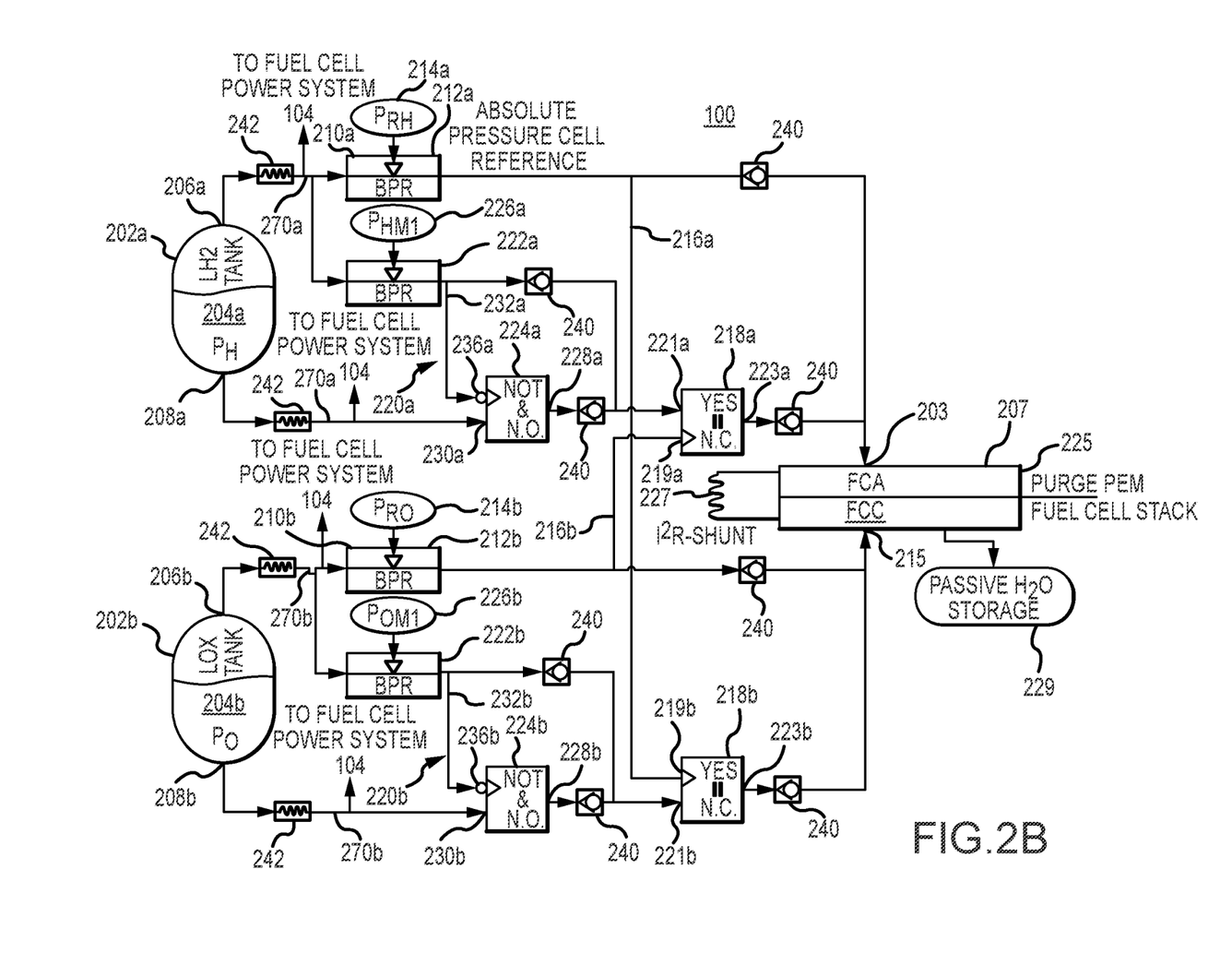
FIG. 2B depicts a pressure control system in accordance with other embodiments of the present disclosure.

With reference now to FIG. 2B, a pressure control system 100 in accordance with further embodiments of the present disclosure is depicted. The pressure control system 100 in this exemplary embodiment provides pressure control and monitoring of first 202a and second 202b reservoirs. More particularly, the pressure control system 100, in response to detecting an overpressure condition in one of the reservoirs 202, supplies a reactant 204 from the overpressure reservoir 202 to a consumer 207, and also supplies a reactant 204 from the other reservoir 202.

The first 202a and second 202b reservoirs generally comprise cryogenic storage reservoirs. Each reservoir 202 includes a first outlet 206 and a second outlet 208. The first outlet 206 provides access to a reactant 204 stored within the reservoir 202 in the form of a gas, while the second outlet 208 provides access to a reactant 204 stored within a reservoir 202 in the form of a liquid.

The first outlet 206 of each reservoir 202 is connected to a respective pressure monitor switch 210. The pressure monitor switch 210 may comprise a back pressure regulator 212 that is associated with a reference pressure cell 214 containing a gas at a reference pressure. The pressure monitor switch 210 opens when it detects a pressure at the respective first outlet 206 that exceeds the reference pressure. When the pressure monitor switch 210 is open, it allows reactant 204 to flow from the first outlet 206 of the reservoir 202 to an input 203 or 215 of the consumer 207. In addition, when the pressure monitor switch 210 is open, it provides an overpressure pilot signal 216 to the control input 219 of a supply switch 218. The presence of the overpressure pilot signal 216 at the supply switch 218 control input 219 opens the supply switch 218 to supply the reactant 204 from the other reservoir 202.

The first outlet 206 of each reservoir 202 is also connected to an outlet selection logic circuit 220. The outlet selection logic circuit 220 generally functions to determine whether a reactant 204 is drawn from an associated reservoir 202 as a gas or a liquid (i.e. from the first outlet 206 or the second outlet 208). In accordance with embodiments of the present disclosure, the outlet selection logic 220 can include a back pressure regulator 222 and a pressure activated relay 224. The back pressure regulator 222 can be associated with a reference cell 226 that contains a gas at a selected minimum pressure. The back pressure regulator 222 is open when the pressure at the first outlet 206 of the associated reservoir 202 is greater than the pressure within the reference cell 226. The pressure activated relay 224 includes an inlet 230 that is in communication with the second outlet 208 of the associated reservoir 202. The pressure activated relay 224 is normally open, in which case reactant 204 drawn as a liquid from the second outlet port 208 of the associated reservoir 202 can pass from the outlet 228 of the pressure activated relay 224 to an associated supply switch 218. When the back pressure regulator 222 is open, indicating that gas pressure within the associated reservoir 202 is at least equal to the selected minimum pressure, a minimum pressure pilot signal 232 is provided to a control input 236 of the pressure activated relay 224, causing the pressure activated relay 224 to close. Reactant 204 is then drawn from the first outlet 206 of the associated reservoir 202 as a gas.

The pressure control system 100 can also include various check valves 240, to maintain the operational integrity of the system. In addition, various heat exchangers 242 can be provided, to increase the temperature of reactants 204 prior to delivering those reactants to the switches, relays, and other logic components of the system 100.

In at least some embodiments, a passive boil-off management system (PBMS) system 100 configured as shown in FIG. 2B is used for $LH_2$ and LOX tanks, and can have the following attributes:

1) The PBMS 100 is designed to be all mechanically passive, repeatable, non-venting and requires no electrical control while managing reactant boil-off;

2) The purge PEM fuel cell stack 225 of the consumer 207 stoichiometrically consumes overpressure $H_2$ and/or $O_2$ producing $H_2O$, enthalpic and I2R heat. It will tolerate a pressure delta across the PEM membrane equal to or greater than $P_R$;

3) The purge PEMFC 225 is sized to be a multi-kilowatt stack thereby allowing it to process very high flow rates of reactants;

4) The process is only active when one or both of the cryogenic reactant storage tank 202 pressures exceeds its relief setting—$P_{RH}$ and/or $P_{RO}$;

5) When tank 202 pressure exceeds its relief pressure ($P_R$) then a back pressure regulator (BPR) 212 opens and charges the anode or cathode of the PEMFC 225 with $H_2$ or $O_2$ respectively;

6) Non-venting pneumatic logic elements are utilized to allow reactants 204 from the non-overpressure tank 202 to be made available to the PEMFC 225;

7) This is accomplished with non-passing pressure activated relays ($PAR_{NP}$) 218 and triggered by the $P_{RH}$ and/or $P_{RO}$ pilot signals 216 from the overpressure tank 202;

8) Once the $PAR_{NP}$ 218 is opened, both reactants 204 are made available to the purge PEMFC 225 and reactants begin to be safely consumed to make $H_2O$ thereby reducing the pressure on the overpressure tank;

9) An additional BPR 222 and passing pressure activated relay ($PAR_P$) 224 are used to control the passing of either liquid or gaseous reactants 204 from the non-overpressurized tank 202 to the PEMFC 225, but flow only occurs if an overpressure event has triggered the corresponding non-passing $PAR_{NP}$ 218;

10) The passive selection of liquid or gas feed guarantees that sufficient flow from the non-overpressurized tank 202 is always available to match the required flow from the overpressurized tank 202;

11) In operation, when guarding locked-up tanks 202, the overpressurized tank 202 will pressure modulate around the hysteresis band of the relieving BPR 212, while the other tank 202 will modulate around the hysteresis band of the liquid/gas BPR 222 based on the minimum pressure setting.

Figure 3:
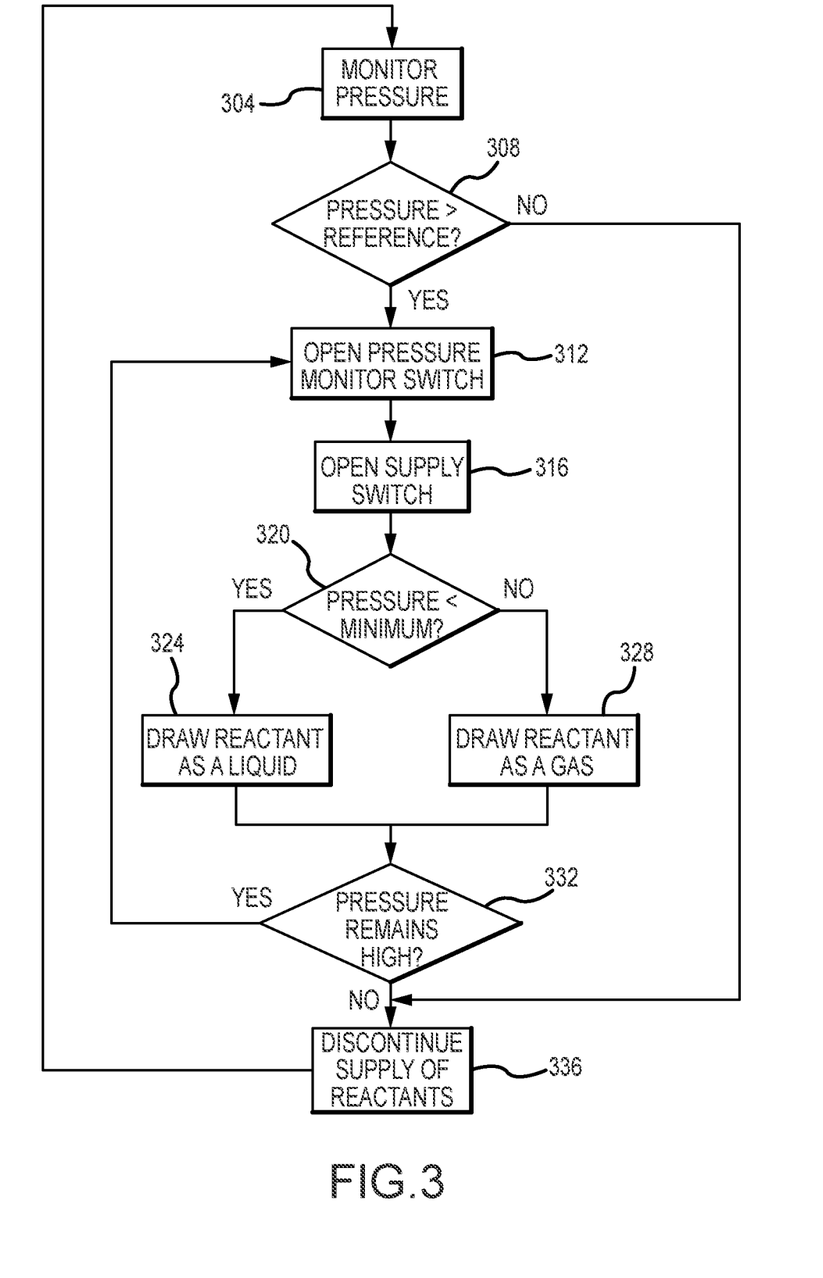
FIG. 3 is a flowchart depicting aspects of the operation of a pressure control system in accordance with embodiments of the present disclosure.

With reference now to FIG. 3, aspects of the operation of a system 100 in accordance with embodiments of the present disclosure are depicted. Initially, at step 304, the pressure within each of the first and second reservoirs 202 is monitored. At step 308, a determination is made as to whether the pressure within one or both of the reservoirs 202 exceeds an associated reference pressure. If the reference pressure associated with a reservoir 202 is exceeded, gas is allowed to flow from the first outlet 206 of the associated reservoir 202, through the pressure monitor switch 210, to the consumer 207 (step 312). In addition, the supply switch 218 associated with the other reservoir 202 is opened, to allow a flow of the other reactant 204 to the consumer 207 (step 316). At step 320, a determination is made as to whether the pressure within the other reservoir 202 is less than a selected minimum pressure. If the pressure in the other reservoir 202 is less than a selected minimum pressure, reactant 204 is drawn from the other reservoir 202 through the second outlet 208, as a liquid (step 324). Alternatively, if the pressure in the other reservoir 202 is greater than the selected minimum pressure, reactant 204 is drawn from that other reservoir 202 through the first outlet 206, as a gas (step 328).

At step 332, a determination is made as to whether the monitored pressure within one or both of the reservoirs 202 continues to exceed the associated reference pressure. If the monitored pressure continues to be greater than the reference pressure, the process returns to step 312. Alternatively, if the monitored pressure is less than the associated reference pressure, the pressure monitor switch 210 is closed, discontinuing the supply of reactants the 204 to the consumer 207 (step 336). More particularly, by closing the pressure monitor switch 210, the connection between the first outlet 206 of the reservoir 202 that was previously overpressure to the associated inlet 203 or 215 of the consumer 207 is discontinued, thereby discontinuing supply of a reactant 204 from that reservoir 202 to the consumer 207. In addition, closing the pressure monitor switch 210 discontinues the provision of a pilot signal to the supply switch 218, which in turn discontinues the supply of reactant 204 from the other reservoir 202 to the consumer 207. The process may then return to step 304. Accordingly, it can be appreciated that the system is always functioning. Moreover, although various of the example steps of the process are depicted and described as occurring sequentially, it should be appreciated that some or all of the steps can be performed simultaneously.

Figure 4:
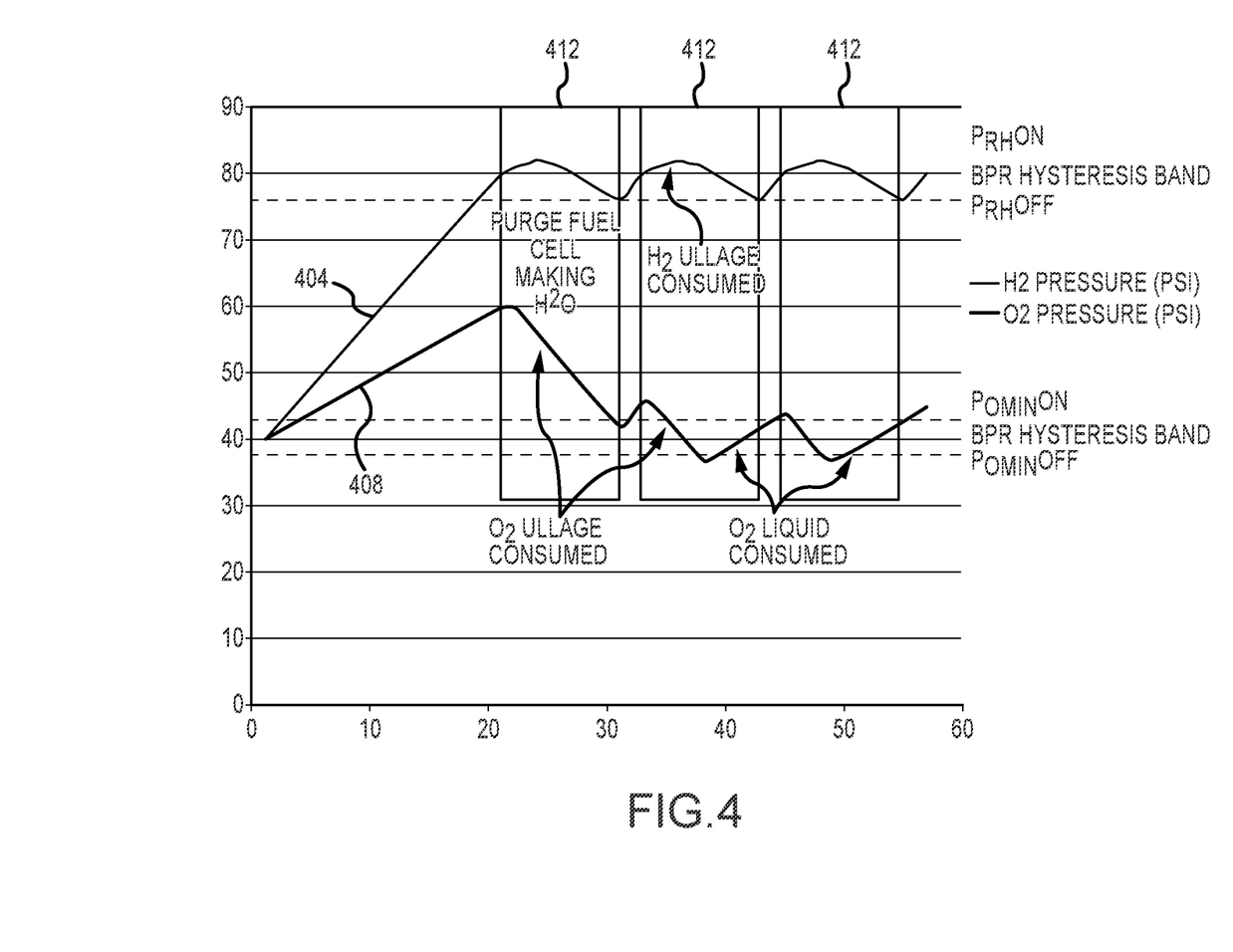
FIG. 4 depicts exemplary reservoir pressures during operation of a pressure control system in accordance with embodiments of the present disclosure.

FIG. 4 depicts exemplary reservoir 202 pressures during operation of a pressure control system 100 in accordance with embodiments of the present disclosure. In the graph, the upper line 404 depicts the pressure of a first reactant 204, in this example hydrogen, within a first reservoir 202. The second line 408 depicts the pressure of a second reactant 204, in this example oxygen, within a second reservoir 202. The shaded areas 412 depicts periods of time during which the reactants 204 are supplied to the consumer 207. In this example, the supply of reactants 204 is triggered by the monitored pressure within the hydrogen containing reservoir 202 exceeding the associated reference pressure. Within the first shaded area 412, oxygen or ullage is consumed, because the pressure of the oxygen in the oxygen containing reservoir 202 is in excess of the minimum pressure value for that reactant 204. Within the second and third shaded area, the oxygen is consumed as a liquid part of the time, because the pressure of the oxygen containing reservoir 202 has dropped to below the minimum pressure value for that reactant 204. The consumption of liquid in the second and third shaded areas is represented by the positive slope of the oxygen pressure toward the end of each consumption cycle.

In accordance with embodiments of the present disclosure, a pressure control system 100 provides a mechanically controlled and activated system for managing pressures within vessels or reservoirs 202 containing cryogenic reactants 204. In an exemplary implementation, the reservoirs 202 normally supply reactants 204 to a primary fuel cell stack 112 that provides electrical power to various loads, such as control, sensor, propulsion, communication or other systems of a vehicle. A conventional, electronically controlled supply system of the fuel cell power system 104 provides the reactants 204 to the primary fuel cell stack 112 based on the electrical demand. In contrast, the pressure control system (PBMS Safety System) 100 removes reactants 204 from the reservoirs 202 when the pressure within one or both of the reservoirs 202 exceeds a reference value, and provides the reactants 204 to a consumer 207 that is specially provided for use with the pressure control system 100. In order to test the integrity of the consumer 207, the control system 100 can include Y-fittings 270a/270b and optional valves (see FIGS. 2A and 2B, optional valves not shown) to admit reactants 204 provided by the conventional supply system to (e.g., directly to) the consumer 207 when the conventional supply system is operated in a test mode. For example, where the consumer 207 is a fuel cell 225, the test mode of the conventional supply system can be operated to supply hydrogen to the anode and oxygen to the cathode of the fuel cell 225, and the operation of the fuel cell 225 can be verified by observing whether electrical power is produced. In accordance with further embodiments of the present disclosure, the controller 114 of the fuel cell power system 104 can determine the operational status of the pressure control system 100 by allowing the pressure in one or both of the reservoirs 202 to rise above the maximum pressure of the respective pressure monitor switch 210. The generation of a current or heat in the resistive load or shunt circuit 227 in response to the pressure condition can be detected by sensor telemetry that is in communication with the controller 114, allowing the controller 114 to verify the operational status of the pressure control system 100. The pressure control system 100 can be the sole system used for pressure management, or can be provided as a redundant system if operation of the conventional supply system fails or is inadequate to control pressures within the reservoirs. Conventional pressure relief valves or burst disks 124, with activation pressures that are greater than the relief pressure of the back pressure regulators 212 can also be used in combination with the pressure control system 100.

As discussed in connection with various exemplary embodiments of the pressure control system 100, the consumer 207 can include a fuel cell 225. Another example of a consumer is a catalytic converter. In addition, where the consumer 207 includes a fuel cell 225, a resistive shunt circuit 227 can be included as a load. A fuel cell 225 can also be connected to an ammeter, voltmeter, or other device that provides a signal to a control system when the fuel cell 225 produces electrical power. This signal can be used to verify proper operation of the fuel cell 225 when operated in a test mode. This signal can also be used as an indication that the control system of the fuel cell power system 104 has failed to prevent a reactant 204 over pressure condition within one or both of the reservoirs 202.

Any underwater, air independent system or vehicle requiring long endurance, high energy density cryogenic liquid hydrogen and liquid oxygen storage will benefit from a pressure control system as described herein. For example, commercial applications involving long endurance UUVs performing underwater survey, resources exploration, underwater pipeline/cable and costal compliance monitoring can benefit.

The foregoing discussion of the disclosed pressure control systems and methods has been presented for purposes of illustration and description. Further, the description is not intended to limit the invention to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
   a first reservoir, wherein the first reservoir includes a first outlet;
   a second reservoir, wherein the second reservoir includes a first outlet; and
   a pressure control system, including:
      a first pressure monitoring switch, wherein the first pressure monitoring switch includes an inlet and an outlet, wherein the inlet of the first pressure monitoring switch is in communication with the first outlet of the first reservoir, wherein the first pressure monitoring switch is in an open condition when a pressure at the inlet of the first pressure monitoring switch is greater than a first reference pressure, wherein the first pressure monitoring switch is in a closed condition when the pressure at the inlet of the first pressure monitoring switch is less than the first reference pressure; and a first supply switch, wherein the first supply switch includes an inlet, an outlet, and a control input, wherein the first supply switch is normally closed, wherein the control input of the first supply switch is connected to the outlet of the first pressure monitoring switch, wherein the inlet of the first supply switch is connected to the first outlet of the second reservoir, wherein an overpressure pilot signal is provided from the outlet of the first pressure monitoring switch to the control input of the first supply switch when the first pressure monitoring switch is in the open condition, and wherein, in response to the overpressure pilot signal, the first supply switch is opened.

2. The system of claim 1, wherein the pressure control system further includes:

a consumer, wherein the consumer includes a first inlet and a second inlet, wherein the first inlet is in communication with the outlet of the first supply switch, and wherein the second inlet is in communication with the outlet of the first pressure monitoring switch.

3. The system of claim 2, wherein the consumer includes a fuel cell.

4. The system of claim 3, wherein the consumer further includes a shunt resistor.

5. The system of claim 4, wherein the first reservoir contains a first one of oxygen or hydrogen, and wherein the second reservoir contains a second one of oxygen or hydrogen.

6. The system of claim 1, wherein the pressure control system further includes:

a selection logic back pressure regulator, wherein the selection logic back pressure regulator includes an inlet and an outlet, wherein the inlet is in communication with the first outlet of the second reservoir.

7. The system of claim 1, further comprising:

a fuel cell power system, including:

a fuel cell, wherein a first input of the fuel cell is connected to the first outlet of the first reservoir, and wherein a second input of the fuel cell is connected to the first outlet of the second reservoir.

8. The system of claim 7, wherein the pressure control system and the fuel cell power system are connected to the first and second reservoirs in parallel.

9. The system of claim 7, wherein the fuel cell of the fuel cell power system is not supplied with reactants by the pressure control system.

10. The system of claim 1, wherein the pressure control system further includes:

a second pressure monitoring switch, wherein the second pressure monitoring switch includes an inlet and an outlet, wherein the inlet is in communication with the first outlet of the second reservoir, wherein the second pressure monitoring switch is in an open condition when a pressure at the inlet of the second pressure monitoring switch is greater than a second reference pressure, and wherein the second pressure monitoring switch is in a closed condition when the pressure at the inlet of the second pressure monitoring switch is less than the second reference pressure; and a second supply switch, wherein the second supply switch includes an inlet, an outlet, and a control input, wherein the control input is connected to the outlet of the second pressure monitoring switch, wherein the inlet is connected to the first outlet of the first reservoir, and wherein the second supply switch is open when the second pressure monitor switch is open.

11. The system of claim 10, wherein the pressure control system further includes:

a first selection logic back pressure regulator, wherein the first selection logic back pressure regulator includes an inlet and an outlet, wherein the inlet is in communication with the first outlet of the first reservoir, and wherein a pathway between the inlet and the outlet of the first selection logic back pressure regulator is open when a pressure at the inlet is greater than a first predetermined minimum pressure;

a first selection logic pressure activated relay, wherein the first selection logic pressure activated relay includes an inlet connected to a second outlet of the first reservoir, a control input that is connected to the outlet of the first selection logic back pressure regulator, and an outlet in communication with the inlet of the first supply switch, wherein the first selection logic pressure activated relay is closed when the first selection logic back pressure regulator is open;

a second selection logic back pressure regulator, wherein the second selection logic back pressure regulator includes an inlet and an outlet, wherein the inlet is in communication with the first outlet of the second reservoir, and wherein a pathway between the inlet and the outlet of the second selection logic back pressure regulator is open when a pressure at the inlet is greater than a second predetermined minimum pressure; and a second selection logic pressure activated relay, wherein the second selection logic pressure activated relay includes an inlet connected to a second outlet of the second reservoir, a control input that is connected to the outlet of the second selection logic back pressure regulator, and an outlet in communication with the inlet of the second supply switch, wherein the second selection logic pressure activated relay is closed when the second selection logic back pressure regulator is open.

12. The system of claim 11, further comprising:

a fuel cell power system, including:

a first fuel cell, wherein a first input of the first fuel cell is connected to the first outlet of the first reservoir, and wherein a second input of the first fuel cell is connected to the first outlet of the second reservoir.

13. The system of claim 12, wherein the pressure control system further includes:

a consumer, wherein the consumer includes a first inlet and a second inlet, wherein the first inlet is in communication with the outlet of the first supply switch, and wherein the second inlet is in communication with the outlet of the second supply switch.

14. The system of claim 13, wherein the consumer includes a second fuel cell.

15. A pressure control system, comprising:

a first reservoir, wherein the first reservoir contains a first reactant and includes a first outlet and a second outlet;

a first pressure monitoring and regulating circuit, wherein an inlet of the first pressure monitoring and regulating circuit is connected to the first outlet of the first reservoir, wherein the first pressure monitoring and regulating circuit allows the first reactant to flow as a gas from the first outlet of the first reservoir when a pressure at the first outlet of the first reservoir is greater than a first reference pressure;

first outlet selection logic, wherein the first outlet selection logic allows the first reactant to flow as a liquid from the second outlet of the first reservoir when a pressure at the first outlet of the first reservoir is less than a first minimum pressure, and wherein the first outlet selection logic prevents a flow of the first reactant through the second outlet of the first reservoir when the pressure at the first outlet of the first reservoir is greater than the first minimum pressure;

a second reservoir, wherein the second reservoir contains a second reactant and includes a first outlet and a second outlet, and wherein the first reactant has a different composition than the second reactant;

a second pressure monitoring and regulating circuit, wherein an inlet of the second pressure monitoring and regulating circuit is connected to the first outlet of the second reservoir, wherein the second pressure monitoring and regulating circuit allows the gas to flow from the first outlet of the second reservoir when a pressure at the first outlet of the second reservoir is greater than a second reference pressure;

second outlet selection logic, wherein the second outlet selection logic allows the second reactant to flow as a liquid from the second outlet of the second reservoir when the pressure at the first outlet of the second reservoir is less than a second minimum pressure, and wherein the second outlet selection logic prevents a flow of the second reactant through the second outlet of the second reservoir when the pressure at the first outlet of the second reservoir is greater than the second minimum pressure;

a first supply switch, wherein the first supply switch includes an inlet, an outlet, and a control input, wherein the first supply switch is nominally closed, wherein the control input of the first supply switch is in communication with the first outlet of the first reservoir via the first pressure monitoring and control circuit when the pressure at the first outlet of the first reservoir is greater than the first reference pressure, and wherein the first supply switch opens to allow a flow of the second reactant as at least one of a gas or a liquid from the second reservoir in response to the control input of the first supply switch being placed in communication with the first outlet of the first reservoir when the pressure at the first outlet of the first reservoir is greater than the first reference pressure; and a second supply switch, wherein the second supply switch includes an inlet, an outlet, and a control input, wherein the second supply switch is nominally closed, wherein the control input of the second supply switch is in communication with the first outlet of the second reservoir via the second pressure monitoring and control circuit when the pressure at the first outlet of the second reservoir is greater than the second reference pressure, and wherein the second supply switch opens to allow a flow of the first reactant as at least one of a gas or a liquid from the first reservoir in response to the control input of the second supply switch being placed in communication with the first outlet of the second reservoir when the pressure at the first outlet of the second reservoir is greater than the second reference pressure.

16. The pressure control system of claim 15, wherein the first pressure monitoring and regulating circuit includes a first back pressure regulator and a first reference cell, and wherein the second pressure monitoring and regulating circuit includes a second back pressure regulator and a second reference cell.

17. The pressure control system of claim 16, wherein the first outlet selection logic includes a third back pressure regulator and a third reference cell, and a first pressure activated relay, and wherein the second outlet selection logic includes a fourth back pressure regulator and a fourth reference cell, and a second pressure activated relay.

18. The pressure control system of claim 17, wherein the first supply switch includes a third pressure activated relay, and wherein the second supply switch includes a fourth pressure activated relay.

19. The pressure control system of claim 18, further comprising:
    a reactant consumer, including:
        a first inlet, wherein the first inlet is supplied with a first reactant from the first reservoir through at least one of the first back pressure regulator or the third back pressure regulator;
        a second inlet, wherein the second inlet is supplied with a second reactant from the second reservoir through at least one of the second back pressure regulator or the fourth back pressure regulator;
        a PEM fuel cell stack;
        a shunt resistor; and
        a product reservoir.

20. The system of claim 1, wherein the first supply switch is a mechanical pressure activated relay.

21. The pressure control system of claim 15, wherein at least one of the first supply switch or the second supply switch is a non-electronically controlled or actuated switch.

22. The system of claim 1, wherein the first supply switch is a pressure activated relay.

23. The pressure control system of claim 15, wherein the first supply switch is a pressure activated relay, and
    wherein the second supply switch is a pressure activated relay.

* * * * *